Patented Dec. 30, 1930

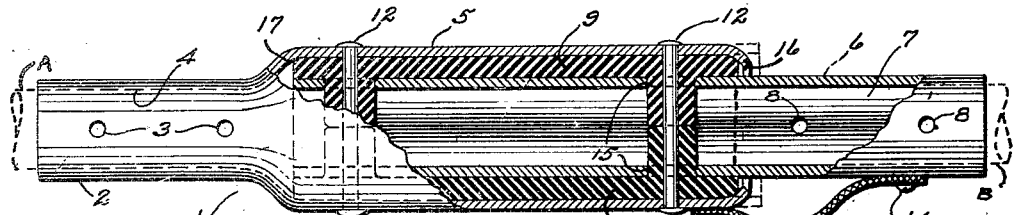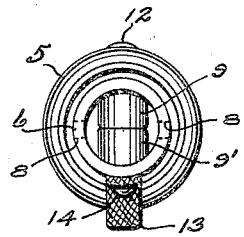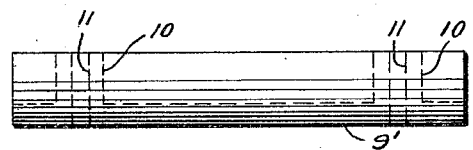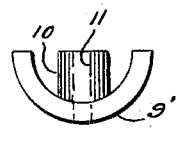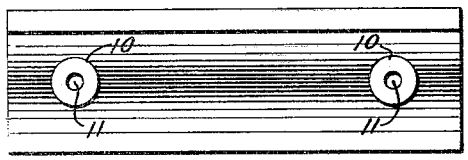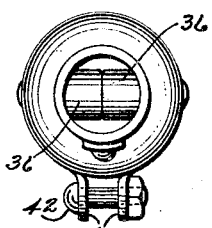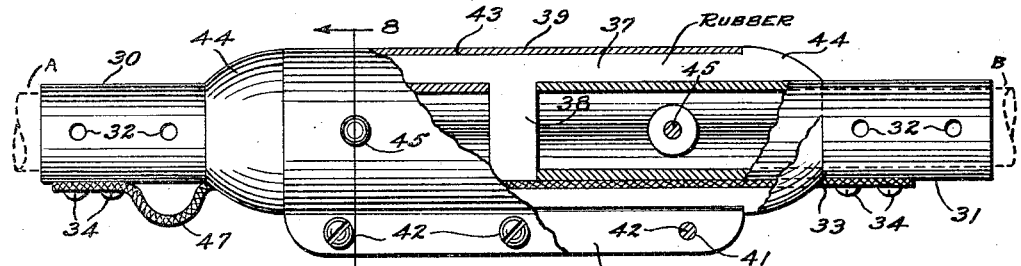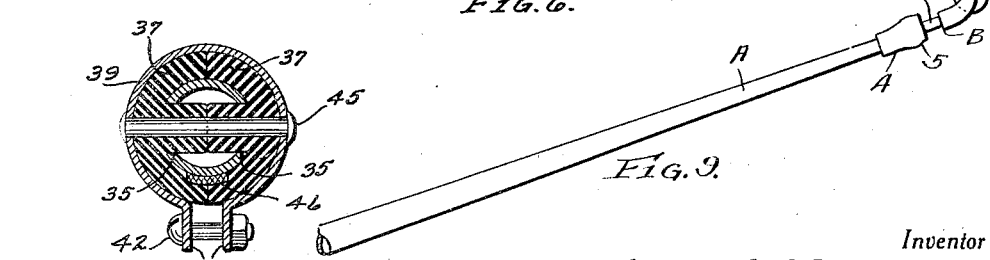

1,786,718

UNITED STATES PATENT OFFICE

EDGAR D. MOORE AND FRED R. DIPPMAN, OF MANSFIELD, OHIO, ASSIGNORS TO THE OHIO BRASS COMPANY, OF MANSFIELD, OHIO, A CORPORATION OF NEW JERSEY

CURRENT-COLLECTOR SUPPORT

Application filed June 10, 1929. Serial No. 369,553.

Our invention relates to current collector supports used in connection with moving vehicles and is adapted to be interposed between the current collector and trolley pole.

The object of our invention is to provide means permitting the current collector to have a limited relative movement with respect to the trolley pole and independently thereof in any transverse direction relative to the axis of the pole, and to also have a limited yielding about the axis of the pole and relative to the pole and to prevent a direct engagement between the support for the current collector and the trolley pole.

Another object of our invention is to prevent the travel of sound waves from the collector into the pole and thence to the car body.

The relative movement of the collector with respect to the pole tends to reduce materially the dewirement of the current collector, as the said independent movement permits the pole to move without forcing the current collector off the wire. Our invention is intended for the upper end of the pole and the weight of the same is small compared to the weight of the trolley pole, and the parts of our device are yieldingly connected together, therefore the effect of the strong springs controlling the trolley pole at its base is not transmitted fully to the current collector, with the result that the current collector maintains contact with the trolley wire to a far greater degree, thereby reducing arcing between the wire and the collector, which reduces the pitting or roughing of the collector and wire, and therefore maintains these parts in better working condition with reduced wear upon the collector and wire.

Also, the tension of the springs at the base of the pole can be materially reduced, thus reducing stress, wear and tear.

Our invention resides in the new and novel construction, combination and relation of the parts herein described and shown in the accompanying drawing.

In the drawing:—

Fig. 1 is a side view in partial section of one form of our invention.

Fig. 2 is an end view at the right of Fig. 1.

Figs. 3, 4, and 5 are side, end and interior views respectively of one of the resilient members which we use.

Fig. 6 is a side view in partial section of another form of our invention involving the same principles, objects and results as that shown in Fig. 1.

Fig. 7 is an end view of Fig. 6.

Fig. 8 is a sectional view on line 8—8 of Fig. 6.

Fig. 9 is an assembly of the device shown in Fig. 1 with a pole and current collector.

In the form shown in Fig. 1, we use a socket member 1 which has a reduced portion 2 which may be adapted to fit into or to receive therein the end of the trolley pole and secured thereto by pins passing through the transverse holes 3. The member 1 is preferably made of tubing, which gives a light construction and therefore provides a passage 4 to receive the trolley pole A. The socket member 1 is also provided with an elongated enlarged portion 5 which is hollow. The recesses in the parts 2 and 5 may be separated by a transverse partition.

The device is also provided with an attaching member 6 which is preferably formed of tubing, thereby providing a passage 7 therethrough. The member 6 may be arranged to either receive within the passage 7 the end of the support B for the current collector, or the member 6 may be arranged to slip into a socket in the collector support, and in either case secured thereto by pins passing through the transverse openings 8.

The member 6 is adapted to be inserted within the enlarged part 5 and spaced therefrom, and interposed between the adjacent surfaces is an elastic, resilient or yielding member 9 and 9' made preferably of rubber but which may also be made of fabricated felting. The parts 9 and 9' are made in duplicate halves and when placed together form a complete tubular bushing with inwardly projecting and integrally formed yielding bosses 10, each having a passage 11, through which pass the rivets 12 to assist in holding the parts in assembled relation with the members 1 and 6 out of engagement under normal conditions; that is, when the collector is off the trolley wire or if engaging the trolley wire, the spring pressure raising the trolley pole is not sufficient to force the members 1 and 6 together. Under normal operating conditions the members 1 and 6 should be out of direct engagement and, therefore, in order to conduct the current on the member 6 to the member 1, we employ a jumper 13 composed of woven or braided copper wires and secured to the parts by means of the rivets or screws 14, or by soldering or welding. As copper is a poor conductor of sound vibrations and since the wires composing the member 13 intermesh in all directions, the member 13 will not conduct sound waves, but it will conduct the current.

The yielding bosses 10 are interlocked with the member 6 through the openings 15 in the wall of the member 6 and the rivets 12 tend to stiffen the bosses 10 and at the same time prevent a total separation of the parts 2 and 6 should such a condition be liable.

The rivets 12, it is quite apparent, may be done away with and the interlock between the member 6 and the members 9 and 9' be made by the bosses 10 projecting into the holes 15.

The outer end of the portion 5 may be bent inwardly and form the flange 16, if desired, and will tend to more nearly harmonize the two ends of the portion 5 in appearance, and if the rivets 12 are eliminated, then the inserts 9 and 9' will be held in position with respect to the part 5 by means of its flange 16 and the bight 17.

With respect to Fig. 1, it will be noted that the rivets 12 may be eliminated so far as holding the parts in predetermined relation under normal conditions is concerned, and that the mechanical interlock between the member 6 and the members 9 and 9' hold these parts in proper relation, and the interlock between the member 1 and the parts 9 and 9' hold these parts in proper relation. Therefore, the parts 1 and 6 are held in their proper predetermined relation through the medium of the interposed resilient or elastic sleeve formed of the parts 9 and 9'.

The parts 9 and 9' may be made in a unit and split along one side, and since the material is yielding and elastic, the part can be spread sufficiently to receive the member 6 and permit the lugs 10 to interlock with the member 6. Also the members 9 and 9' may be made larger than just sufficient to fill the space between the parts 5 and 6 and pressed into position under compression.

It will also be apparent that our device can be disassembled if desired and certain of the parts used over in case of repairs. Also it will be apparent that with the present state of the rubber art, that the sleeve composed of the parts 9 and 9' may be molded as a single sleeve directly upon the member 6, thus making the member 6 and the interposed sleeve a unitary device, which in turn may be inserted into the enlarged part 5 and held in that position by means of the rivets 12 or by the flange 16 which forms a part of the enlarged portion 5, or by both, or by the expanding pressure of the sleeve 9—9' against the inner wall of the part 3.

The member 13 is looped so that it offers no part in maintaining the members 1 and 6 in their predetermined relation.

In the form shown in Fig. 6 we employ two members 30 and 31, which may either be hollow to receive therein or slip into the end of the trolley pole and collector support, or made solid to slip into the trolley pole and collector support and held in position by means of rivets passing through the transverse holes 32. The members 30 and 31 have an aligned relation with a common axis and they are spaced apart to prevent any direct contact so as to prevent sound vibrations passing from one to the other. This necessitates the use of a jumper member 33 composed of braided or woven copper wires and secured to the parts 30 and 31 by means of the screws 34, or other approved means.

The members 30 and 31 are provided with oppositely disposed openings 35 in the walls thereof to receive the bosses 36 which form an integral part of the rubber sleeves 37. When applied to the members 30 and 31, the members 37 form an enclosing resilient, elastic, yielding sleeve and to further assure the parts 30 and 31 being maintained in a separate relation, a transverse partition or web 38 is formed as a separate or integral part of the sleeve member 37.

In order to hold the parts thus far described in pretermined relation, an external sleeve or clamp 39 is used which has spaced wings 40 with oppositely disposed holes 41 through which pass the screw headed bolts 42, by means of which the clamp 39 may be drawn tightly upon the sleeve portion 37, and the sleeve 37—37 brought into strong compressive relation with the parts 30, 31 and 39. In order to maintain an interlock between the rubber sleeve and the clamp 39, the members 37 forming the sleeve have a wide groove 43 in their outer surface.

The ends 44 of the sleeve are rounded not only for the sake of appearance, but to offer less obstruction to the device sliding along a span wire if the trolley pole should leave the trolley wire, and for that reason the wings 40 are positioned on the lower side of the device when assembled to the pole.

Rivets 45 may be used if desired to further lock the parts together and as an emergency feature; they are not necessary however and do not electrically connect the parts 30 and 31.

The member 33 is shown as embedded within the rubber and extending along the surface of the parts 30 and 31. It is quite evident that in this case a groove 46 would be formed in the members 37. Also, the member 33 may be looped outside the device and take a position between the wings 40. The member 33 is provided with a loop 47 so as to avoid any binding or restraining action upon the movement of the members 30 and 31.

The members 13 and 33 may have one end secured to the part supporting the current collector, that is, 6 or 31 respectively, and the other end may be connected to the trolley pole after the device is installed or extend directly into the car, thus leaving the trolley pole and base dead. In the latter case the members 13 and 33 would probably be insulated.

The flange 16 may be rolled inward to a greater or less degree, thus affecting the resiliency of the rubber insert through pressure.

The devices herein described have their rigid parts co-axial and when assembled on a trolley pole, the axes of the pole and rigid parts substantially coincide.

Having described our invention, we claim:—

1. An insulating device for attachment to a trolley pole comprising a deformable insulating body of resilient rubber, a metal member provided with a receptacle therefor, a metal member embedded in and interlocked with the insulating body against separation therefrom, and projecting therefrom, means on one metal member for attachment to a pole and means on the other metal member for attachment to a collector support.

2. A coupling device for a trolley pole and current collector support comprising two rigid members having adjacent spaced faces and adapted to be secured respectively to the pole and support, a body of yieldable material interposed between the adjacent faces of the rigid members and means formed separate from the rigid members for locking the yielding body with each of the rigid members but permitting a limited relative movement, the said means being transversely disposed to the longitudinal direction of the device.

3. A coupling device for a trolley pole and a current collector comprising two rigid members having adjacent parallel spaced faces extending parallel to the axis of the device, a yielding body interposed between the faces and transverse means extending through the members and body to hold them together.

4. A coupling device for a trolley pole and a current collector comprising two rigid members having adjacent spaced faces extending parallel to the axis of the device, a yielding body interposed between the faces, transverse means extending through the members and body to hold them together and insulated from one of the rigid members.

5. A coupling device for a trolley pole and a current collector comprising two rigid members having adjacent spaced faces extending parallel to the axis of the device, a yielding body interposed between the faces, transverse means extending through the members and body to hold them together and insulated from one of the rigid members, and a flexible member electrically connecting the rigid members.

6. A coupling device for a trolley pole and current collector comprising two rigid members having adjacent spaced surfaces, a body of elastic material interposed between the surfaces, means extending through the members and body and electrically insulated from one member to hold the members and body together, means to secure one member to the trolley pole and an electric conductor secured to the other member to conduct current therefrom.

7. A connecting device for a trolley pole and current collector comprising rigid members extending in the same direction and having a common axis and spaced surfaces, a tubular body of elastic material to yieldingly hold the members in electrically insulated alinement, auxiliary means extending transversely to the said device to hold the elastic body in a predetermined relation to one member and other auxiliary means to hold the elastic body in a predetermined relation to the other member.

8. A separately formed device to connect a current collector to a trolley pole comprising three separately formed members having a common axis and a part of one of the members overlapping a part of another member, and the third member holding the other two members in spaced, insulated and yielding relation, the third member being mechanically interlocked with one of the said members by transversely disposed means, means on one member to secure the members to a trolley pole against relative rotation and with the axes of the pole and device substantially coinciding, and means to electrically connect the outer and inner members.

9. A separately formed device to connect a current collector to a trolley pole comprising two rigid, spaced and insulated members concentrically arranged with respect to each other and yieldingly held in said relation by an interposed body formed of elastic material secured to one of the members and transversely disposed means to secure the body to the member, the members and body having a common longitudinal axis coinciding with that of the trolley pole when applied thereto and one of the members provided with means for application to the trolley pole.

10. A trolley pole device for holding a trolley pole and a current collector in predetermined relation comprising two rigid members held in spaced, insulated and yielding relation, a resilient member interposed between the rigid members having integrally formed yielding means interlocked with means on one of the rigid members to hold the members against further separation.

11. A trolley pole device for holding a trolley pole and current collector in predetermined relation comprising two rigid members for attachment to the trolley pole and current collector respectively, a split sleeve of resilient material interposed between the members and having integrally formed means interlocked with means on one of the members to hold the members in an insulated, spaced and yielding relation.

12. A device described comprising in combination two spaced parts for attachment to a trolley pole and to a current collector respectively, a member of resilient material interposed between the spaced parts and transversely disposed means interlocked with one of the parts to hold the parts together without electrically connecting the parts.

13. In a device of the class described, the combination of a pair of metal members spaced apart, one member arranged to support a current collector and the other member arranged to receive a trolley pole, a body of resilient insulating material having a portion engaging the two members to hold them in spaced relation and another portion having an exposed surface and extending along the surface of one member to decrease the surface leakage between the members.

14. An insulating joint to connect a current collector and a pole comprising, a part to connect to the pole, a part to support the collector, the parts having holding surfaces and a yieldable rubber body having a portion to connect the parts mechanically and hold them in separated relation and extending along the holding surfaces, one part having an end located adjacent the other part and the yieldable body having another portion interposed between the said end and the said adjacent part and forming with the aforesaid portion an enclosure for the said one part.

15. The combination with a trolley pole and current collector of a connecting device comprising rigid members extending in the same direction and having a common axis and also having spaced surfaces extending in the same direction and which surfaces engage a tubular body of elastic material to yieldingly hold the members separated and in alinement and auxiliary means extending in the direction of the said axis and arranged to grip the tubular body and overlapping the surfaces of the rigid members but spaced therefrom.

16. A connecting device for holding a trolley pole and current collecting device in predetermined relation comprising two rigid members for attachment to the pole and to support the collecting device respectively and having a common axis and surfaces extending parallel to the axis, a body of resilient material engaging the surfaces and holding the members in spaced relation and adjustable means to bring the body into varying degrees of engagement with the said surfaces.

17. A connecting device for holding a trolley pole and current collecting device in predetermined relation comprising two rigid members for attachment to the pole and to support the collecting device respectively, and having a common axis and surfaces extending substantially parallel to the axis, a body of resilient and yieldable material engaging the surfaces and holding the members in spaced relation, clamping means to clamp the body and transversely disposed auxiliary means to lock the clamping means to the body to hold them against separation in an axial direction.

18. A device for securing a trolley pole and a current collector together comprising a pair of rigid, alined and spaced members, one to be attached to the pole and the other to be attached to the collector, a body of elastic material engaging the outer surfaces of the members and interlocked therewith, and a rigid member encircling the elastic body.

19. A trolley device comprising a pair of co-operating parts out of direct electrical contact with one another, an interposed member of resilient material arranged between the parts and holding the parts together and a clamping member to engage the outer surface of the resilient member to force the resilient member and said parts into closer relation.

In testimony whereof we affix our signatures.

EDGAR D. MOORE.
FRED R. DIPPMAN.